Oct. 30, 1951  J. S. MALSBARY  2,572,942
ALIGNING DEVICE
Filed Aug. 20, 1948
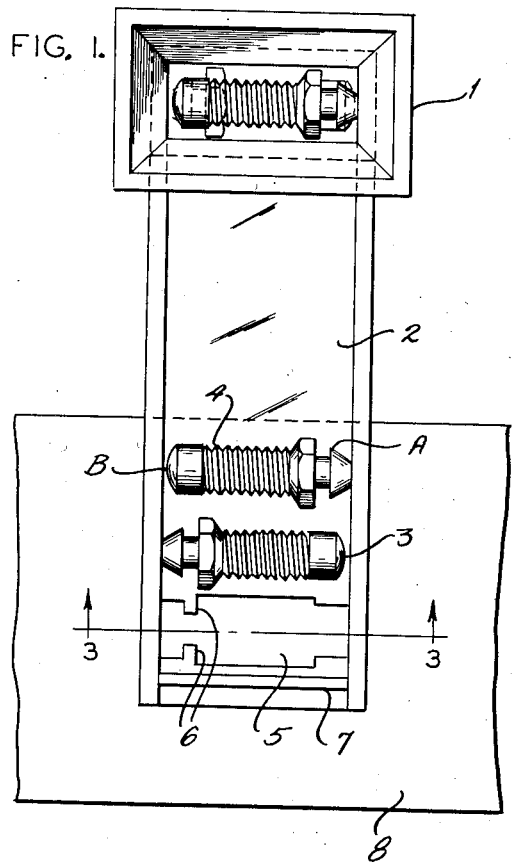
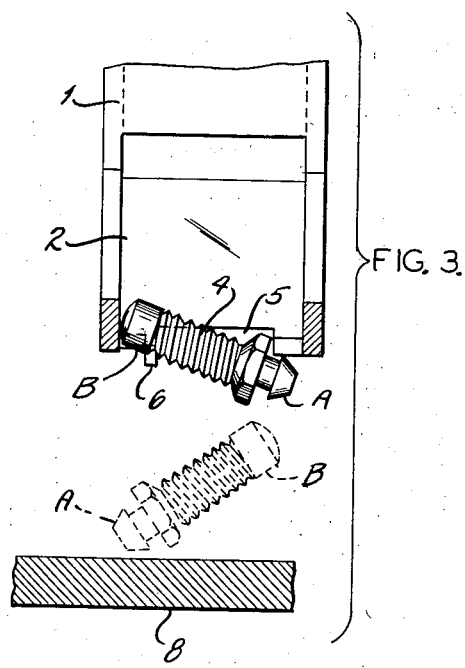
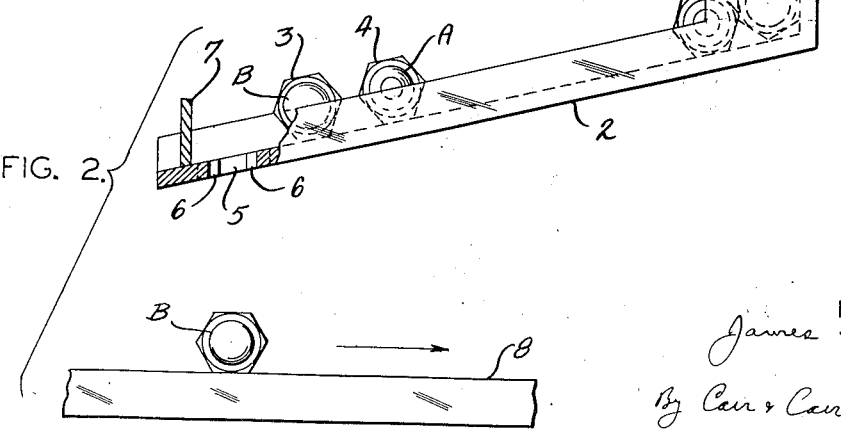
INVENTOR:
James S. Malsbary,
By Carr & Carr & Gravely,
HIS ATTORNEYS.

Patented Oct. 30, 1951

2,572,942

UNITED STATES PATENT OFFICE 2,572,942

ALIGNING DEVICE

James S. Malsbary, Glendale, Mo., assignor to Wagner Electric Corporation, St. Louis, Mo., a corporation of Delaware Application August 20, 1948, Serial No. 45,391

4 Claims. (Cl. 193—43)

This invention relates to an apparatus which will align in identical spatial relationship irregularly shaped bodies of the same contour. The object of the invention is to provide simple mechanical means for aligning members of a class of similar but irregularly shaped bodies, thereby providing a more rapid method of operation than has heretofore been possible which is more reliable than manual methods and at the same time eliminates tedious manual alignment.

This invention consists of a means for receiving a quantity of articles to be aligned which are allowed to individually slide down a chute and during the downward movement to align themselves in one of two alternative positions, after which they pass through an arranging device associated with the chute by means of which they are caused to properly align themselves on a receiving bed or conveyor.

In the drawings:

Fig. 1 is a top plan view of a device embodying this invention,

Fig. 2 is an elevational side view thereof, looking toward the left in Fig. 1; and Fig. 3 is a sectional view taken substantially along the line 3—3 of Fig. 1.

A specific example of the application of this invention is in the case of aligning, prior to inspection, the bleeder screws used in hydraulic brake systems, although the device is equally applicable to other irregularly shaped articles. The numeral 1 designates a suitable hopper for holding bleeder screws for hydraulic brake systems. Beneath the hopper 1 and connected therewith, lies an inclined chute 2 in which are positioned oppositely disposed bleeder screws 3 and 4. At the end of chute 2 is cut a selector guide opening 5 from whose sides project selector arms 6. A barrier 7 is disposed across chute 2 just below guide opening 5 and at right angles to the base of the chute. Beneath chute 2 lies a suitable article receiver 8 which may be a bed or conveyor on which the aligned articles fall. After passing through selector opening 5, the screws drop onto article receiver 8 properly aligned, screw 3 of Fig. 1 being shown in the correct position on the receiver.

Operation of the apparatus is begun by filling the hopper 1 with bleeder screws. These screws drop from the hopper into chute 2. By reason of the incline of chute 2, the bleeder screws will progress therealong in either of two alternative orientations, as illustrated in Fig. 1. Bleeder screw 3 passes into selector guide opening 5 after having contacted barrier 7 whose function is to insure a proper parallel alignment of the screws with selector guide opening 5. Bleeder screw 3 does not encounter selector arms 6, thus falling through guide opening 5 in the same relative orientation in which it rolled down chute 2. The screw 3 merely drops onto receiver 8 as shown in Fig. 2. Bleeder screw 4, however, contacts barrier 7 and passes into selector opening 5 but by reason of its reversed orientation, encounters different circumstances. The bleeder screws are thicker in diameter at portion B than at portion A so that one portion will pass between selector arms 6 and the other portion will not pass between these arms, consequently the instant bleeder screw 4 is in the selector opening 5, portion A drops through the right hand side while portion B is engaged by selector arms 6. When portion A has dropped through the selector opening, portion B slides off the side of selector arms 6 which is toward portion A. The effect of this is to impart an angular longitudinal spin to bleeder screw 4. The receiver 8 is placed the requisite distance below chute 2 so that bleeder screw 4 will accomplish an odd number of one-half revolutions and land in the same relative orientation as bleeder 3 on receiver 8, as shown in Fig. 2. This operation continues as long as there are screws in hopper 1.

An alternative form of apparatus would employ receiver 8 as a continuous movable conveyor so that the aligned articles would be removed from beneath the chute 2 as rapidly as they are discharged therefrom, the conveyor preferably moving in the direction of the arrow in Fig. 2.

This device permits articles to fall directly on a bed or conveyor and correctly orients those not properly positioned so that when they are in position on the bed or conveyor, each article will be properly aligned or oriented. In the instant device each article to be aligned approaches the sorting position in a direction substantially 90° displaced from the major axis of the article, thereby facilitating the ultimate alignment of the articles.

What I claim is:

1. An apparatus for aligning in the same orientation irregularly shaped similar articles comprising a hopper containing a quantity of these articles randomly oriented; a chute down which each of said articles passes in one of two alternative relative orientations; a barrier against which these articles come to rest in order to insure parallel alignment thereof; a selector opening formed in said chute through which said articles fall; a pair of selector arms disposed in said selector opening which act to spin those of the articles having one orientation while not disturbing the free fall of those articles having the other orientation; and receiving means onto which said articles may fall located at such a distance beneath the chute that said articles of both orientations will be similarly positioned thereon.

2. An article orienting means comprising a hopper provided with a discharge opening for receiving a quantity of articles to be oriented to similar positions; an inclined chute positioned below the discharge opening for receiving articles dropped from said hopper, the chute having such length that articles will slide down and while sliding will align themselves in one of two possible parallel orientations transversely of said chute, said chute having a discharge opening formed in one end thereof; an article receiving means disposed below said chute, and a selector opening in said chute provided with means for enabling articles in one of said oriented positions to fall directly onto said article receiving means and those articles in the other oriented position to spin through at least a half revolution so that all articles will be similarly oriented on said article receiving means.

3. An article orienting means comprising a hopper provided with a discharge opening for receiving a quantity of articles to be oriented to similar positions; an inclined chute positioned below the discharge opening for receiving articles dropped from said hopper, the chute having such length that articles will slide down and while sliding align themselves in one of two possible parallel orientations transversely of said chute, a selector opening in the lower end of said chute through which the articles fall; an article receiving means disposed below said chute; means in said chute for aligning each article with said opening; and means in said opening for enabling articles in one of said oriented positions to fall directly onto said article receiving means and those articles in the other oriented position to spin through at least a half revolution so that all articles will be similarly oriented on said article receiving means.

4. An article orienting means comprising a hopper provided with a discharge opening for receiving a quantity of irregularly shaped articles; an inclined chute disposed below said hopper and having one end disposed below said opening, said chute having a length sufficient to enable articles discharged thereon to orient themselves in one of two parallel positions transversely of said chute, a selector opening in the other end of said chute; an article receiving means positioned below said opening; means mounted in said chute for aligning said articles with said opening; means projecting into said opening for causing articles in one oriented position to fall directly onto said article receiving means and for causing articles in the other oriented position on said chute to be spun through a predetermined rotation to enable said articles to fall on said article receiving means in the same position as those which fall directly through said opening.

JAMES S. MALSBARY.

REFERENCES CITED

The following references are of record in the file of this patent:

UNITED STATES PATENTS

| Number | Name | Date |
| --- | --- | --- |
| 1,242,086 | Von Henriquez | Oct. 2, 1917 |
| 1,692,275 | Mortus | Nov. 20, 1928 |
| 2,105,084 | Kivley et al. | Jan. 11, 1938 |
| 2,377,154 | Hurley, Jr. | May 29, 1945 |
| 2,458,546 | Woodberry et al. | Jan. 11, 1949 |

FOREIGN PATENTS

| Number | Country | Date |
| --- | --- | --- |
| 453,052 | Germany | Nov. 28, 1927 |
| 455,591 | Germany | Mar. 3, 1932 |